US010397359B2

(12) United States Patent
Schooler et al.

(10) Patent No.: US 10,397,359 B2
(45) Date of Patent: Aug. 27, 2019

(54) STREAMING MEDIA CACHE FOR MEDIA STREAMING SERVICE

(71) Applicant: Google Inc., Mountain View, CA (US)

(72) Inventors: Richard Schooler, Cambridge, MA (US); Pawel Jurczyk, Newton, MA (US)

(73) Assignee: GOOGLE LLC, Mountain View, CA (US)

( * ) Notice: Subject to any disclaimer, the term of this patent is extended or adjusted under 35 U.S.C. 154(b) by 152 days.

(21) Appl. No.: 15/396,130

(22) Filed: Dec. 30, 2016

(65) Prior Publication Data
US 2018/0191857 A1 Jul. 5, 2018

(51) Int. Cl.
| H04L 29/08 | (2006.01) |
| G06F 16/435 | (2019.01) |
| G06F 16/487 | (2019.01) |
| G06F 16/48 | (2019.01) |
| G06F 16/2457 | (2019.01) |
| H04L 29/06 | (2006.01) |
| H04N 21/00 | (2011.01) |

(52) U.S. Cl.
CPC .... *H04L 67/2842* (2013.01); *G06F 16/24578* (2019.01); *G06F 16/435* (2019.01); *G06F 16/487* (2019.01); *G06F 16/489* (2019.01); *H04L 65/602* (2013.01); *H04N 21/00* (2013.01)

(58) Field of Classification Search
CPC ... H04L 67/2842; H04L 65/60; H04L 65/602; G06F 16/435; G06F 16/487; G06F 16/489; G06F 16/24578; H04N 21/00
See application file for complete search history.

(56) References Cited

U.S. PATENT DOCUMENTS

| 2007/0094452 A1* | 4/2007 | Fachan | G06F 12/0862 |
| | | | 711/137 |
| 2014/0047192 A1* | 2/2014 | DeVries | G06F 12/0862 |
| | | | 711/137 |

(Continued)

OTHER PUBLICATIONS

Cao, P., et al., "Cost-Aware WWW Proxy Caching Algorithms," USENIX Association, Dec. 1997, pp. 1-14.

(Continued)

*Primary Examiner* — Tonia L Dollinger
*Assistant Examiner* — Steven C Nguyen
(74) *Attorney, Agent, or Firm* — Young Basile Hanlon & MacFarlane, P.C.

(57) ABSTRACT

A solution is provided for selectively caching streaming media based on playback data associated with the streaming media. Each media stream is divided into a number of media chunks. Spatial locality and temporal locality of each media chunk is analyzed based on playback data of the media chunk and the corresponding media stream. Based on the spatial locality and temporal locality, a spatial score and temporal score are generated, respectively. Aggregation of the spatial score and temporal score produces a final score for the media chunk. The media chunks are ranked based on their final scores, where all or a number of media chunks are selected based on their rankings for being cached. The ranking of a cached media chunk decays over time, and the ranking of a cached media chunk is dynamically recalculated when another video chunk is to be cached.

17 Claims, 7 Drawing Sheets

(56) References Cited

U.S. PATENT DOCUMENTS

2014/0207912 A1* 7/2014 Thibeault ............ H04L 65/4084
709/219
2015/0089016 A1* 3/2015 Jellison, Jr. ............. H04L 65/60
709/217
2015/0208120 A1* 7/2015 Yao .................. H04N 21/25833
725/9

OTHER PUBLICATIONS

Megiddo, N., et al., "Arc: A Self-Tuning, Lowoverhead Replacement Cache," Proceedings of FAST '03: 2nd USENIX Conference on File and Storage Technologies, USENIX Association, Mar. 31-Apr. 2, 2003, pp. 115-130.

* cited by examiner

Scores at t1
440

| Video Chunk | Spatial Score | Temporal Score | Final Score |
|---|---|---|---|
| I(1) | 1 | 4 | 5 |
| I(2) | 1 | 4 | 5 |
| I(3) | 0 | 4 | 4 |
| I(4) | 0 | 4 | 4 |
| II(2) | 1 | 2 | 3 |
| II(3) | 1 | 2 | 3 |
| II(4) | 0 | 2 | 2 |
| III(1) | 0 | 1 | 1 |
| III(2) | 0 | 1 | 1 |
| III(3) | 0 | 1 | 1 |
| III(4) | 0 | 1 | 1 |

Rankings at t1
442

| Video Chunk I(1) | Video Chunk I(2) | Video Chunk I(3) | Video Chunk I(4) | Video Chunk II(2) | Video Chunk II(3) | Video Chunk II(1) | Video Chunk II(4) | Video Chunk III(1) | Video Chunk III(2) | Video Chunk III(3) | Video Chunk III(4) |

Streaming Video Cache at t1
444

| Video Chunk I(1) | Video Chunk I(2) | Video Chunk I(3) | Video Chunk I(4) | Video Chunk II(2) | Video Chunk II(3) | Video Chunk III(1) | Video Chunk III(4) |

Scores at t2
480

| Video Chunk | Spatial Score | Temporal Score | Final Score |
|---|---|---|---|
| I(1) | 0 | 1 | 1 |
| I(2) | 0 | 1 | 1 |
| I(3) | 0 | 1 | 1 |
| I(4) | 0 | 1 | 1 |
| II(1) | 1 | 4 | 5 |
| II(2) | 1 | 4 | 5 |
| II(3) | 1 | 4 | 5 |
| II(4) | 0 | 4 | 4 |
| III(1) | 1 | 2 | 3 |
| III(2) | 1 | 2 | 3 |
| III(3) | 0 | 2 | 2 |
| III(4) | 0 | 2 | 2 |

Rankings at t2
482

| Video Chunk II(1) | Video Chunk II(2) | Video Chunk II(3) | Video Chunk II(4) | Video Chunk III(1) | Video Chunk III(2) | Video Chunk III(3) | Video Chunk III(4) | Video Chunk I(1) | Video Chunk I(2) | Video Chunk I(3) | Video Chunk I(4) |

Streaming Video Cache at t2
484

| Video Chunk II(1) | Video Chunk II(2) | Video Chunk II(3) | Video Chunk II(4) | Video Chunk III(1) | Video Chunk III(2) | Video Chunk III(3) | Video Chunk III(4) |

FIG. 4D

STREAMING MEDIA CACHE FOR MEDIA STREAMING SERVICE

BACKGROUND

The described embodiments relate generally to storing streaming media, and more particularly to caching streaming media based on spatial locality and temporal locality of portions of media streams.

The sharing of videos having a variety of different content and encoded in different formats through video hosting services represents a growing need for effective organization, indexing and management. In the context of streaming electronic media, e.g., videos and audios, to viewers, there is some "locality" in streaming the requested media. For example, the same media streams or portions of a media stream are usually accessed multiple times in a given time period. Thus, caching streaming media, or maintaining temporary copies of media data locally, makes the media data more accessible by users compared to serving the streams from a central store. However, caching media data can be expensive because there may be multiple copies of the same media data cached to requesting users, and caches may reside in faster storage, which generally has a limited cache capacity. Thus, it is important to prioritize what data to put in the cache.

Many solutions are known for data caching in general, with particularly rich histories in computer processors (instruction and data caches) and operating systems (notably disk I/O and file systems. Particularly relevant to media caching is existing work on web proxies and Content Delivery Networks (CDNs). The most common caching algorithm is LRU (evict the Least Recently Used element). Other caching algorithms are typically described as variants of LRU, or at least compared with LRU. But the existing solutions face challenges to provide effective caching services. For example, most existing solutions fail to make full use of limited cache capacity, or fail to adapt to changes in user access patterns over time, or fail to use specific features of streaming media (e.g., popularity of a streaming media among multiple viewers) to improve caching performance.

SUMMARY

Described methods, systems and computer program readable storage medium storing executable computer program instructions provide solutions for enhanced caching of streaming media using a scoring function to prioritize streaming media data for caching. For illustration purpose only, the following description uses video as an example of media stream. However, described methods, systems and computer program products can be applied to other types of media streams, such as audio.

One embodiment includes a method for caching chunks (e.g., fixed-size chunks or variable-size chunks) of media streams based on spatial locality and temporal locality of the media streams. The method includes dividing each media stream into multiple media chunks. The method analyzes spatial locality and temporal locality for each media chunk. Analysis of the spatial locality and temporal locality is based on playback data of the media chunk. The playback data may comprise information about the media chunk, such as information describing a sequential access pattern to the media chunk requested by a user. The playback data may also comprise information about the media stream of the media chunk, such as information describing the media stream being recently accessed by one or more users and timestamp of each access of the media stream.

Spatial locality refers to an access pattern of nearby content, where a user accesses nearby content over a predetermined period of time. For example, a user who accesses the beginning of the media chunk will usually request nearby content, i.e., subsequent content in the same media chunk, over a small span of time. The spatial locality analysis process determines whether a user's access of the media chunk has reached the end of the playback of the media chunk. It is noted that a user who accesses a media chunk will request sequential portions of the media chunk as long as the access does not reach the end of the playback of the media chunk.

Temporal locality refers to an access pattern of popular content, where a user accesses the same content by different playback sessions, or the same content is accessed by multiple users simultaneously. For example, a popular media stream is accessed by a user multiple times over a small span of time or by multiple users around the same time. The temporal locality analysis process determines the popularity of the media stream. Popularity of the media stream may be determined on a user by user basis for further obtaining augmented popularity of the media stream. For example, a popularity score is computed for each of the users who have accessed the media stream. The popularity score is inversely related to time elapsed since the user's access of the media stream. The augmented popularity of the media stream is generated based on the popularity scores for the users.

A spatial score and temporal score for the media chunk is determined based on the spatial locality analysis and temporal locality analysis, respectively. A final score for each media chunk is obtained by aggregating the spatial score and the temporal score of the media chunk. Based on the final scores, those media chunks are ranked. A selected number of highest ranked media chunks may be cached or a selected number of lowest ranked media chunks may be evicted from the cache in view of finite storage space of a streaming video cache. In one embodiment, an initial ranking of a video chunk is determined based on its final score. The ranking of a cached video chunk may be updated every time the video chunk is inserted or accessed again. Likewise, the ranking of a cached video chunk may be decreased over time when the video chunk is not re-used. Alternatively, a ranking of a video chunk can be dynamic, e.g., the temporal score of the video chunk is determined based on the popularity of the video chunk at the time of caching or eviction.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

It is to be understood that the Figures and descriptions of the invention have been simplified to illustrate elements that are relevant for a clear understanding of the embodiments of the invention, while eliminating, for the purpose of clarity, many other elements found in a typical media cache and method of caching media. Those of ordinary skill in the art may recognize that other elements and/or steps are desirable and/or required in implementing the invention. However, because such elements and steps are well known in the art, and because they do not facilitate a better understanding of the invention, a discussion of such elements and steps is not provided herein. The disclosure herein is directed to all such variations and modifications to such elements and methods known to those skilled in the art.

Figure 1:
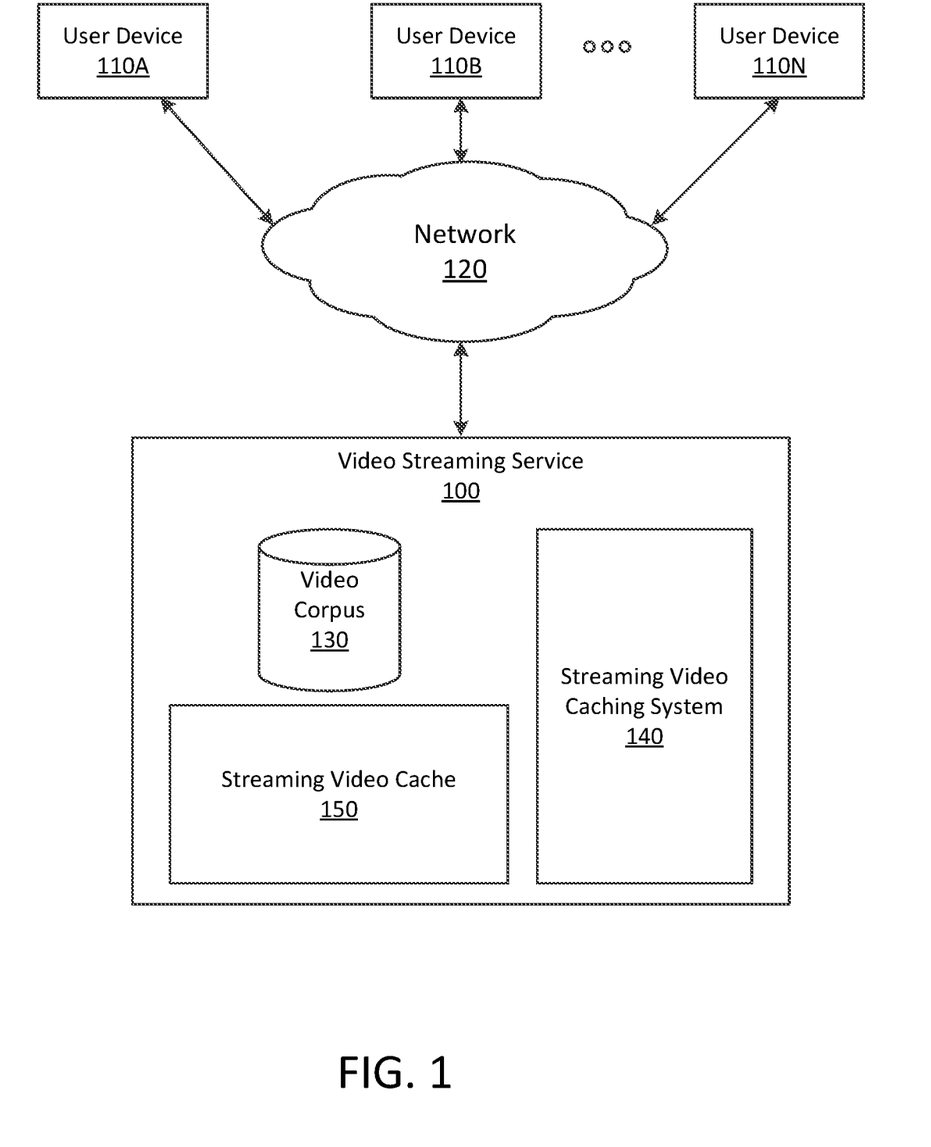
FIG. 1 is a block diagram of a video streaming service having a streaming video caching system, according to one embodiment.

FIG. 1 is a block diagram of a video streaming service 100 having one streaming video caching system 140, according to one embodiment. Multiple users, by using the user devices 110A-N, request one or more streaming videos and send their requests to the video streaming service 100 via a network 120. The video streaming service 100 provides streaming video caching services in response to requests for streaming videos through the streaming video caching system 140, and sends cached videos (or cached video chunks) of the requested streaming videos to the user devices 110A-N. In alternative embodiments, the video streaming service 100 may have more than one streaming video caching system 140, where each streaming video caching system 140 is associated with the video corpus 130 and serves at least some of the same user devices 110.

Turning to the individual entities illustrated in FIG. 1, each user device 110 is used by a user to send requests for streaming videos to the video streaming service 100 and watch the requested streaming videos provided by the video streaming service 100. The user device 110 can be any type of computer devices, such as a personal computer (e.g., desktop, notebook, laptop), and other types of devices, such as a mobile telephone, a tablet or a personal digital assistant that has the capability to play back streaming videos.

The user device 110 typically includes a processor, a display device (or output to a display device), a local storage, such as a hard drive or flash memory device, to which the user device 110 stores data used by the user in performing tasks, and a network interface for coupling to the video streaming services 100 via the network 120. The user device 110 also has a video player (e.g., the Flash™ player from Adobe Systems, Inc., or a proprietary one) for playing back streaming videos. The video player may be a stand-alone application, or a plug-in to another application such as a network browser. Where the user device 110 is a general purpose device (e.g., a desktop computer, laptop computer, mobile phone), the player is typically implemented as software executed by the user device 110. Where the user device 110 is dedicated device (e.g., a dedicated video player), the player may be implemented in hardware, or a combination of hardware and software. All of these implementations are functionally equivalent in regards to the embodiments of the invention.

The network 120 enables communications between the user devices 110A-N and the video streaming service 100. In one embodiment, the network 120 is the Internet, and uses standardized internetworking communications technologies and protocols, known now or subsequently developed that enable the user devices 110A-N to communicate with the video streaming service 100. In another embodiment, the network 120 is a cloud computing network and includes one or more components of the video streaming service 100.

In the embodiment shown in FIG. 1, the video streaming services 100 comprises a video corpus 130, a streaming video caching system 140, and a streaming video cache 150. Other embodiments of the video streaming service 100 may include other and/or different modules. The video corpus 130 stores a plurality of videos for streaming upon user requests. The videos may be created by a user device 110 and sent to the video streaming service 100 via the network 120. The video may also be acquired from other resources and stored in the video streaming service 100.

In one embodiment, each video is divided into a plurality of video segments or chunks. The video streaming service 100 stores a selected number of video chunks of a video, rather than the whole video, in the streaming video cache 150. In one embodiment, the video chunks have a fixed size. In another embodiment, the video chunks have variable sizes. The size(s) of the video chunks may be pre-determined manually or by the video streaming service 100 based on one or more factors. One factor is features of the videos stored in the video corpus 130. For example, if the length of a video for streaming is short, the size(s) of the video chunks of the video can be small. In that way, it can avoid putting the whole video into a cache (e.g., the streaming video cache 150) when only a portion of the video is worth caching. Another factor is the storage size of the cache. For example, if the storage size of the cache is small, the size(s) of the video chunks can be small so that a reasonable number of video chunks can be cached.

Another factor for determining the size of the video chunks of a video is one or more features of the streaming video cache 150. For example, if the streaming video cache 150 has very limited storage, the fixed size of the video chunks should be smaller to make sure a sufficient number of video chunks can be cached. Watching habits of the users may also be taken into account. For example, user access data may indicate that a majority of the user devices 110A-N often only request access to a small portion of each video, as opposed to finishing the whole or most of the video. In such a situation it is a better use the limited cache capability by having small-sized video chunks. In other embodiments, there can be other factors to consider for determining the size of the video chunks.

Resources for caching are usually limited, thus, it is usually impractical to cache all video chunks, and it is important to determine which video chunks to cache. The streaming video caching system 140 ranks the video chunks to determine which ones are more likely to be accessed by users in a short period of time and therefore, which ones should be cached. The video chunks are ranked based on playback tracking. Playback tracking includes analysis of two types of locality for each video chunk in consideration (also referred to as "candidate video chunk" hereinafter): spatial locality and temporal locality. Spatial locality of a video chunk refers to an access pattern of nearby content, where a user accesses nearby content over a predetermined period of time. For example, a user who accesses the beginning a video chunk usually requests nearby content, e.g., sequential portions of the video chunk, over a small span of time. It is noted that a user who accesses a video chunk will request subsequent portions of the video chunk as long as the access does not reach the ends of the playback of the video chunk. Temporal locality refers to an access pattern of popular content, where a user accesses the same content by different playback sessions, or the same content is accessed simultaneously by multiple users. For example, a popular video is accessed by a user multiple times over a small span of time or by multiple users around the same time. Accordingly, the video chunks of a more popular video are ranked higher for caching than those of a less popular video. More details about the streaming video caching system 140 is described in conjunction with FIG. 2 and FIG. 3.

Once the streaming video caching system 140 determines the rankings of the video chunks, the streaming video cache 150 caches all the video chunks, or a selected number of highest ranked video chunks by evicting a selected number of lowest ranked video chunks from the streaming video cache 150. The number of video chunks that can be cached in the streaming video cache 150 depends on the size of the video chunks and the storage space of the streaming video cache 150. Video chunks cached in the streaming video cache 150 are updated upon a change in the rankings of the video chunks. In that case, the streaming video cache 150 caches the highest ranked video chunks, which are mostly like to be requested by user devices 110A-N over a small span of time. Thus, use of the streaming video cache 150 is kept maximized.

Figure 2:
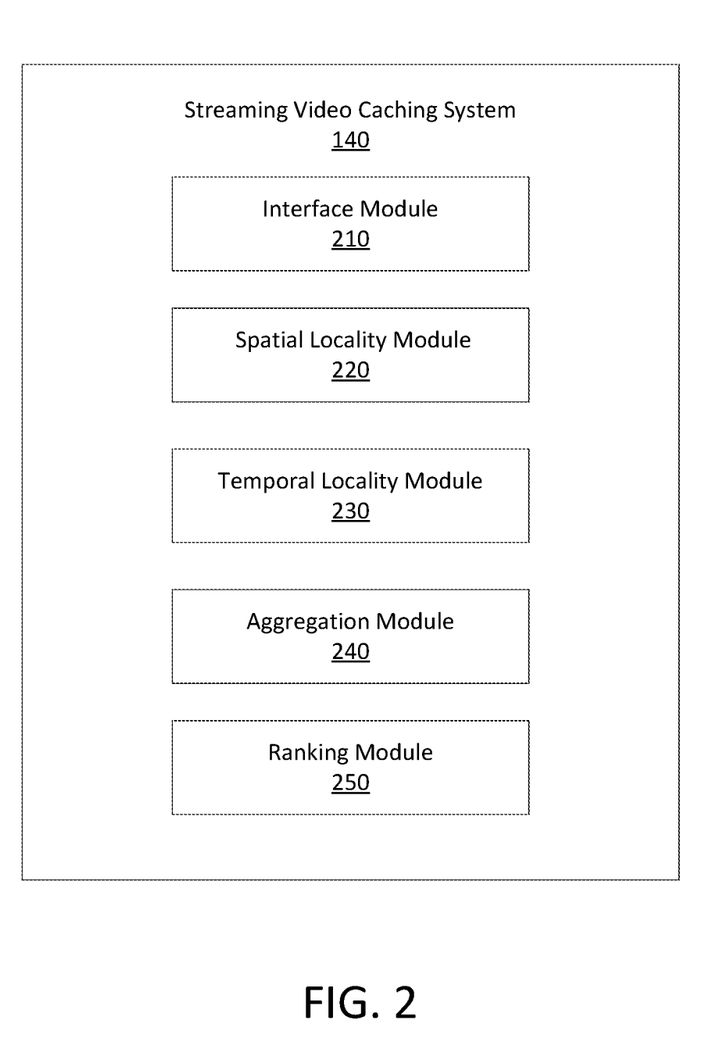
FIG. 2 is a block diagram of the streaming video caching system shown in FIG. 1, according to one embodiment.

FIG. 2 is a block diagram of the streaming video caching system 140 shown in FIG. 1, according to one embodiment. As shown in FIG. 2, the streaming video caching system 140 comprises an interface module 210, a spatial locality module 220, a temporal locality module 230, an aggregation module 240, and a ranking module 250. Other embodiments of the streaming video caching system 140 may include additional or different modules.

The interface module 210 processes inputs to and outputs from the streaming video caching system 140. The interface module 210 receives playback data of video chunks from the user devices 110A-N through the network 120 and provides the received playback data to the spatial locality module 220 and the temporal locality module 230 for spatial locality and temporal locality analysis, respectively. The playback data may include information describing the video chunks being recently accessed by one or more user devices, identifications of the user devices and timestamp of the each access. The interface module 210 receives rankings of the video chunks from the ranking module 250 and provides the rankings to the streaming video cache 150 for caching a selected number of highest ranked video chunks. The rankings of the video chunks changes with time, as the spatial locality and/or temporal locality of the video chunks change with time. For example, responsive to a streaming video having a lower temporal score due to decreased popularity, the corresponding ranking of the video chunks of the streaming video is decreased accordingly. Responsive to changes in the rankings, the interface module 210 provides the updated rankings to the streaming video cache 150 for update.

The interface module 210 also receives user requests for video chunks of a video, and stores the user requests in a storage (not shown). Each user request has metadata including user identification (ID) of a user device 110 used by the user to send the request, identification of the video requested, a timestamp of the request, and identification of each video chunk requested. The metadata associated with each request can be used by other modules for analyzing spatial locality and temporal locality of the video chunk as further described below.

The spatial locality module 220 analyzes spatial locality of video chunks that are requested by one or more users through their user devices 110 and generate a spatial score for each video chunk based on playback data associated with the video chunk. The playback data includes information describing a sequential access pattern to a video chunk requested by a user through his/her device 110.

The spatial locality module 220 determines whether an access of the user has reached the end of the playback of the video chunk. For example, if the access is at a beginning or in the middle of a video chunk, it is very likely that the user will access the same video chunk in a short period of time. Accordingly, the spatial locality module 220 predicts that the user will make an access request for the same video chunk in a short time of period. The spatial locality module 220 assigns a high spatial score to the video chunk indicating a high probability to cache the video chunk. However, if the access reaches the end of the playback of the video chunk, it is very likely that the user will not access the same video chunk in a short time of period because the user is about to finish the viewing of the whole video chunk. Accordingly, the spatial locality module 220 predicts that the user is not likely to access the same video chunk in a short time of period. The spatial locality module 220 assigns a low spatial score to the video chunk indicating a low probability to cache the video chunk. Thus, a spatial score of a video chunk represents a prediction of likelihood of one or more subsequent requests for the same video chunk over a short period of time.

The short period of time for spatiality analysis may be predetermined. It can be 10 seconds, one minute or even one hour. The duration of the predetermined period of time may depend on other factors, such as the viewing history of the user devices 110 A-N, the characteristics of the videos, e.g., duration of a video, source of a video, etc., the fixed size of the video chunks and the capability of the streaming video cache 150.

In one embodiment, the spatial locality module 220 determines spatial locality of a video chunk by comparing the specific position of the video chunk requested by a user with the size of the video chunk as a whole. The spatial score of a video chunk can be either 1 or 0. For example, when the access of a video chunk by a user does not reach the end of a video chunk (i.e., the specific position in the video chunk requested by the user is within the length/size of the video chunk), the spatial locality module 220 assigns a spatial score of 1 to the video chunk; on the other hand, when the requested access reaches the end of the video chunk, the spatial locality module 220 assigns a spatial score of 0 to the video chunk. Video chunks that are not accessed by any user receive a spatial score of 0. Spatial scores can be of values other than 1 or 0, such as 10, 100, etc. In that case, the spatial locality module 220 may assign a higher spatial score to a video chunk when a user accesses the beginning of the video chunk, versus a lower spatial score to a video chunk when a user accesses the middle of the video chunk, and an even lower score to a video chunk when a user accesses the end of the video chunk. Other types of prediction of one or more subsequent requests for the same video chunk over a predetermined period of time may be applied, e.g., the spatial locality module 220 predicting the number of subsequent accesses of a chunk by a user, given a position and length of a current user access. For example, if the chunk size is one MB, the user access started at 200 KB and the length of the user access is 100 KB, it is predicted that there would be seven subsequent accesses of the chunk by the user if the length of each subsequent access is 100 KB.

The temporal locality module 230 analyzes temporal locality of video chunks that are requested by one or more users through their user devices 110 and determines a temporal score for each video chunk. The analysis of temporal locality of a video includes determining popularity of the video that is composed by the requested video chunks. It is noted that a more popular video is more likely to have its corresponding video chunks accessed again and therefore, it is more valuable to cache the video chunks of the video.

In one embodiment, playback data of the video are used to determine its popularity. The playback data may include recent playback sessions and therefore includes information describing the video being recently accessed by one or more users and timestamp of each access of the video. Information describing the video being recently accessed by one or more users may also include identifications of the user devices 100 used by the users to access the video and features of the video itself, such as content provider of the video.

The temporal locality module 230 determines a temporal score for each video chunk. In one embodiment, the temporal locality module 230 determines a temporal score for each video chunk based on the popularity of the video comprising the video chunk. The temporal locality module 230 may determine one or more popularity scores of a video accessed by one or more users and aggregate the popularity scores to obtain an augmented popularity score of the video. To compensate for the possible decrease in popularity of a video over time, the temporal module 230 may use a time decay function to compute popularity score of a video. In other words, the popularity score for a video is inversely related to time elapsed since a user request was made. Thus, a more recently accessed video has a higher popularity score than a video being accessed a while ago. For example, a video being accessed ten seconds ago has a higher popularity score than a video being accessed ten minutes ago. One example of a time decay function is harmonic decay, where the popularity score of a video is proportional to 1/N, and N is the length of elapsed time.

In one embodiment, for each user who accessed a video whose popularity score is being determined, the temporal locality module 230 determines a popularity score of the video with respect to that user. Based on the popularity scores of the video accessed by multiple users, the temporal locality module 230 computes an augmented popularity of the video. In one embodiment, each user access of the video has the same weight, and the augmented popularity of the video equals to the sum of the popularity scores of video from the multiple users who have accessed the video. In another embodiment, each user access to the video has different weights. Different weights may be assigned to different accesses based on users' viewing histories and access patterns and other suitable factors. The temporal locality module 230 may assign a weight to each user access, and then compute a weighted popularity score for each user access. The weighted popularity score is equal to the weight of the user access times the corresponding popularity score of the video with respect to that user access. The augmented popularity score of the video equals to the sum of the weighted popularity scores from all users who have accessed the video. In some embodiments, the temporal locality module 230 determines popularity scores only for a selected number of user accesses (e.g., ten).

Augmented popularity of a video may be generated in other suitable methods. The temporal locality module 230 may use offline algorithms to examine playback data of longer term. For example, the temporal locality module 230 may analyze the access history of a user for a long period of time (e.g., a month-old access history) to predict which types of videos are more popular at a specific date or time. Also, the temporal locality module 230 may consider one or more characteristics of a video to determine popularity of the video, such as the theme, the content length, the source/publisher, and the relevance of the video to current popular topics.

The temporal locality module 230 computes a temporal score for a video chunk which is a part of the video based on the augmented popularity of the video. For example, each video chunk of the video has a temporal score equal to the augmented popularity of the video. In addition to augmented popularity of the video, the temporal locality module 230 may consider other factors for generating temporal scores for the video chunks of the video.

The aggregation module 240 aggregates the spatial score and temporal score of each video chunk to obtain a final score for each video chunk. In one embodiment, the aggregation module 240 sums up the spatial score and temporal score of a video chunk to obtain a final score of the video chunk. However, the aggregation module 240 may use a more complicated method to aggregate the spatial score and temporal score of a video chunk, such as weighted summation of the spatial score and the temporal score of each video chunk. The aggregation module 240 may weigh the spatial score and temporal score differently to accurately predict how likely the video chunk will be accessed in a short period of time. For example, if the size of the video chunks is small, the spatial locality is probably not as important as the temporal locality because a user who accessed the video chunk is more likely to finish the viewing of the video chunk despite of whether the access is in the beginning of the video chunk or towards the end of the video chunk. In that case, the aggregation module 240 assigns two different weights to the spatial locality and temporal locality, where the weight score of the spatial locality is lower. Then the aggregation module 240 sums up the product of the weight of the spatial locality times the spatial score and the product of the weight of the temporal locality times the temporal score to obtain a final score of the video chunk. In addition to the size of the video chunks, the aggregation module 240 may consider other factors to determine weights for spatial locality and temporal locality, such as user access history, one or more characteristics of the videos and capability of the streaming video cache 150.

Once the aggregation module 240 obtains a final score for each video chunk, the ranking module 250 ranks the video chunks based on the final scores of the video chunks such that the rankings of the video chunks can be used to determine which video chunks are evicted when a new video chunk is to be inserted into the streaming video cache 150.

A video chunk with a higher final score indicates a higher ranking. In one embodiment, the rankings of the video chunks based on the final scores of the video chunks are initial rankings. A ranking of a video chunk can be decreased over time when the video chunk is not re-used. The video chunks are dynamically ranked again when a new video chunk is to be inserted into the streaming video cache 150. For example, the ranking module 250 dynamically ranks the video chunks based on the popularity of the video chunk at the caching or eviction time. The ranking module 250 may order the video chunks according to the rankings of the video chunks, e.g., from the highest ranking to the lowest ranking.

Figure 3:
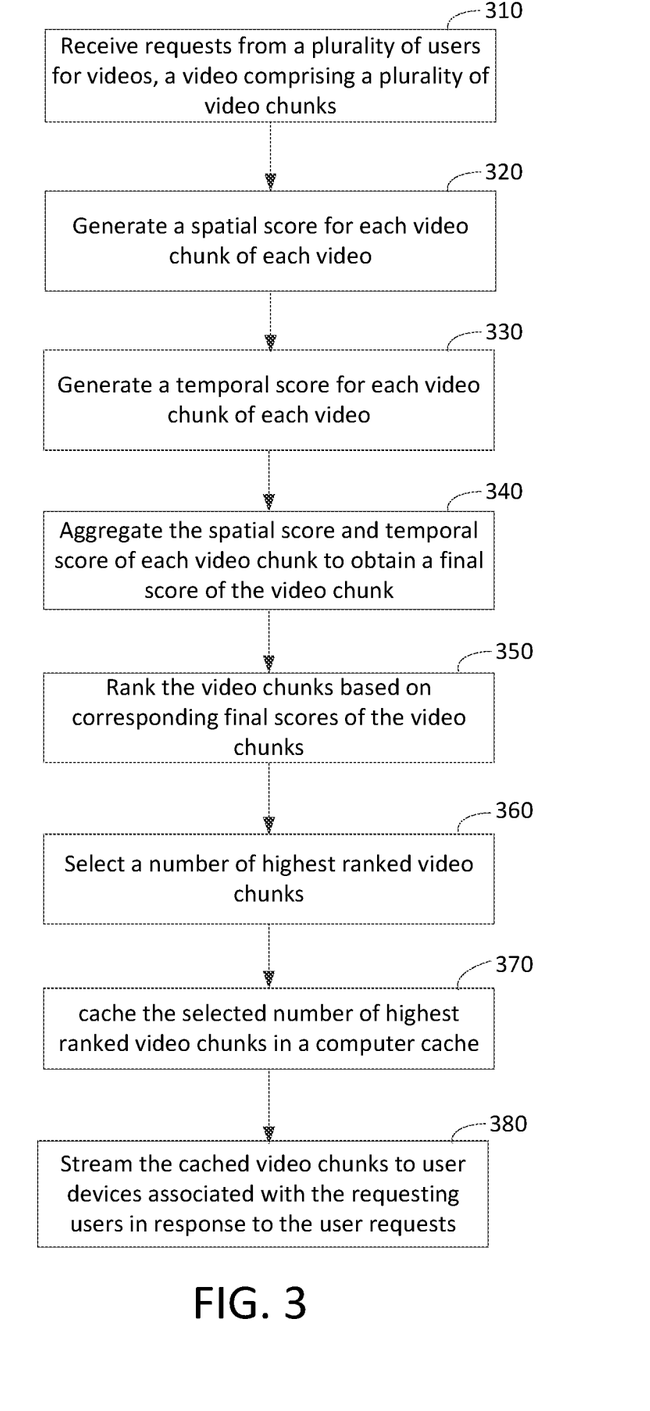
FIG. 3 is a flow chart of caching streaming videos based on playback data associated with the videos, according to one embodiment.

FIG. 3 is a flow chart illustrating a method of caching streaming videos based on playback data associated with the videos, according to one embodiment. In some embodiments, the method is performed by a streaming video caching system 140, although some or all of the operations in the method may be performed by other entities in other embodiments. In some embodiments, the operations in the flow chart are performed in a different order and can include different and/or additional steps.

The streaming video caching system 140 receives 310 requests from a plurality of users for videos, a video comprising a plurality of video chunks. The requests are received through the network 120. The streaming video caching system 140 generates 320 a spatial score for each video chunk of each video. The spatial score represents a prediction of a likelihood of receiving one or more subsequent requests for the same video chunk over a predetermined period of time. Generating the spatial score comprises analyzing spatial locality of the video chunk. The streaming video caching system 140 generates 320 a temporal score for each video chunk of each video. The temporal score represents a prediction of a likelihood of receiving another request for the media chunk. Generating the temporal score comprises analyzing temporal locality of the video chunk. The streaming video caching system 140 aggregates 340 the spatial score and temporal score for each video chunk to obtain a final score of the video chunk. The streaming video caching system 140 ranks 350 the video chunks based on corresponding final scores of the video chunks. The streaming video caching system 140 selects 360 a number of highest ranked video chunks and caches 370 the selected number of highest ranked video chunks to a computer cache. Alternatively, the streaming video caching system 140 may select a number of lowest ranked video chunks to evict from the streaming video cache 150 given the finite storage space of the streaming video cache 150. The streaming video caching system 140 streams 380 the cached video chunks to user devices 110 associated with the requesting users in response to the user requests.

The spatial scores and the temporal scores of the video chunks are updated when there is change in the playback data of the video chunks. Accordingly, the final scores and rankings of the video chunks are updated. When the rankings of the video chunks change, a different group of video chunks are cached or evicted from the cache, e.g., re-ranking the video chunks, selecting a number of video chunks for caching or eviction based on the new rankings, and caching or evicting the newly selected video chunks.

Figure 4A:
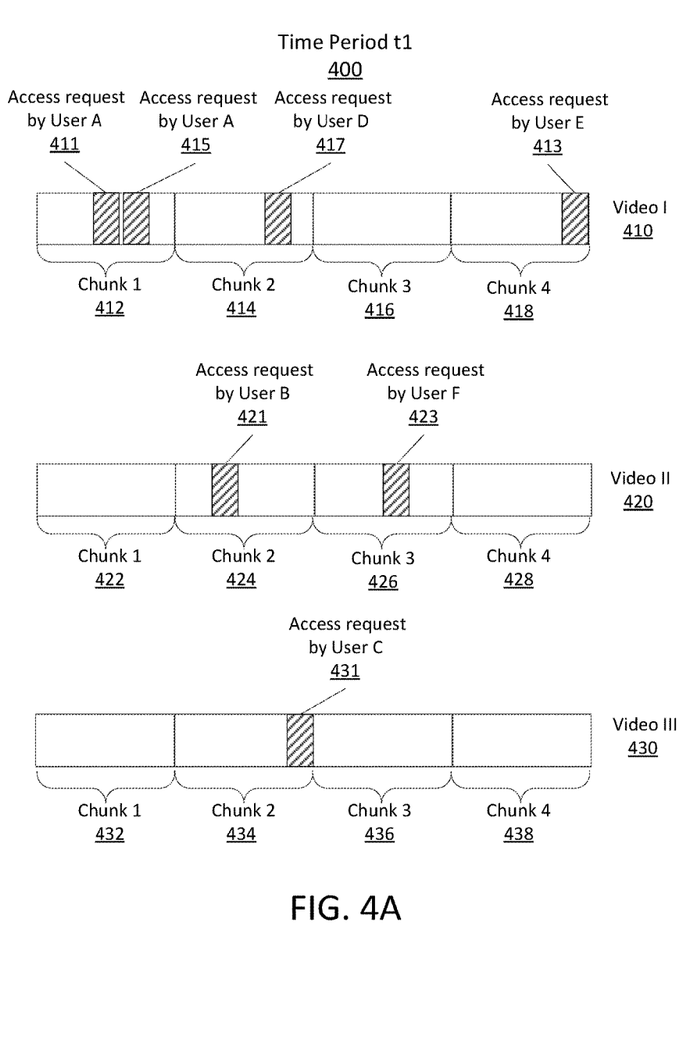
FIG. 4A is an example of access requests for multiple video chunks of multiple videos made by multiple users at a time period t1, according to one embodiment.

FIG. 4A-D include examples of caching streaming videos based on playback data of the video chunks at two different time periods, t1 and t2, according to one embodiment. For example, the time periods t1 and t2 are two different short span of time. FIG. 4A is an example of access requests for multiple video chunks of multiple videos made by multiple users at a time period t1, according to one embodiment. FIG. 4A includes three videos: video I 410, video II 420 and video III 430. Video I 410 has four video chunks: Chunk 1 412, Chunk 2 414, Chunk 3 416 and Chunk 4 418. Video II 420 has four video chunks: Chunk 1 422, Chunk 2 424, Chunk 3 426 and Chunk 4 428. Video III 430 has four video chunks: Chunk 1 432, Chunk 2 434, Chunk 3 436 and Chunk 4 438.

For Video I, User A make two sequential access requests 411 and 415 for Chunk 1 412. Neither of the two access requests 411 and 415 by User A reaches the end of Chunk 1 412. Also, User D makes an access request 417 for Chunk 2 414 at a position in the middle of Chunk 2 414. User E makes an access request 413 for Chunk 4 418 at a position reaching the end of Chunk 4 418. No user makes any access request for Chunk 3 416. For Video II 420, no user makes any access request for Chunk 1 422 and Chunk 4 428. But User B makes an access request 421 for Chunk 2 424 at a position not reaching the end of Chunk 2 424. User F makes an access request 423 for Chunk 3 426 at a position not reaching the end of Chunk 3 426. For Video III 430, no user makes any access request for Chunk 1 432, Chunk 3 436 or Chunk 4 438. User C makes an access request 431 for Chunk 2 434 but the request position reaches the end of Chunk 2 434. Users A-G in FIG. 4A may make the access requests by using one or more user devices 110. The access requests are sent to the streaming video caching system 140 through the network 120.

Figure 4B:
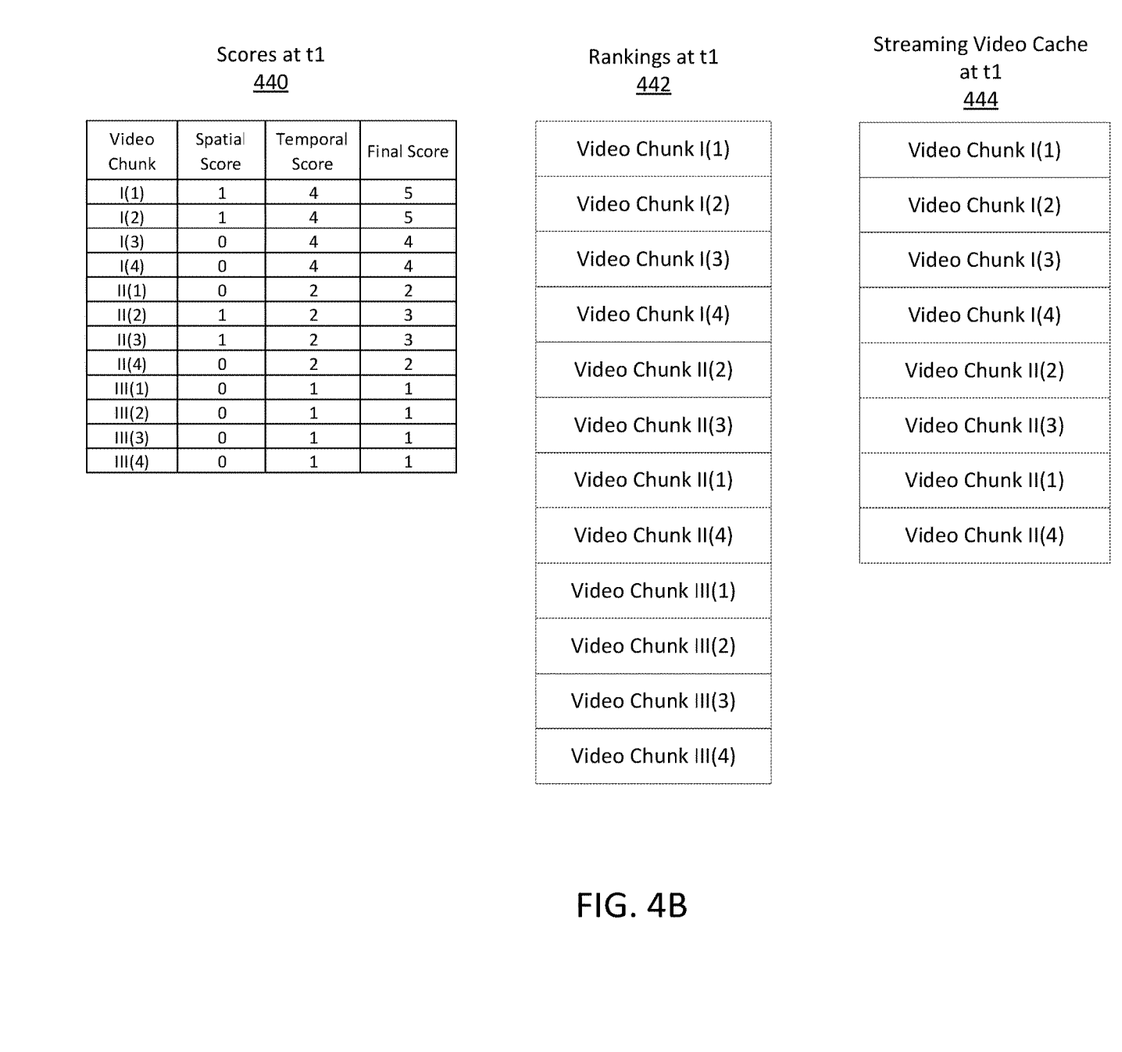
FIG. 4B is an example of the spatial scores, temporal scores, final scores and rankings of the video chunks in FIG. 4A and a streaming video cache at t1, according to one embodiment.

FIG. 4B is an example of the spatial scores, temporal scores, final scores and rankings of the video chunks in FIG. 4A and a streaming video cache at t1, according to one embodiment. The spatial scores, temporal scores and final scores of all the twelve video chunks in FIG. 4A are listed in table 440. The rankings of the video chunks are listed in table 442. The streaming video cache 444 at t1 is based on the rankings of the video chunks.

The spatial scores of the twelve video chunks are listed in the second column of table 440. In the embodiment of FIG. 4B, a spatial score is a binary value. The spatial score of a video chunk is 0 if no user makes any access request for the video chunk or a user makes an access request for the video chunk but the request position reaches the end of the video chunk. The spatial score of a video chunk is 1 as long as there is one access request that does not reach the end of the video chunk, regardless of how many access requests there are. Accordingly, for Video I 410, Chunk 1 412 and Chunk 2 414 each has a spatial score of 1; and Chunk 3 416 and Chunk 4 418 each has a spatial score of 0.

The same method for generating spatial scores is used for the video chunks of Video II 420 and Video III 430. Thus, for Video II 420, Chunk 1 422 and Chunk 4 428 each has a spatial score of 0; and Chunk 2 424 and Chunk 3 426 each has a spatial score of 1. For Video III 430, Chunk 1 432, Chunk 2 436, Chunk 3 436 and Chunk 4 428 each has a spatial score of 0.

The temporal scores of the video chunks are listed in the third column of table 440. In the generation of the temporal scores, it is assumed that all the access requests for the videos are made at the same time, meaning that each access request is given the same weight. Also, each access request by a user results in a popularity score of 1. Accordingly, the temporal score of a video equals to the number of users who make access requests for the video. Thus, video I 410 has a temporal score of 4 because three users, User A (who accessed Chunk 1 412 twice), D and E, make access requests for Video I 410 at time period t1. The four video chunks of video I 410 each have a temporal score of 4 because the temporal score of a video chunk equals the temporal score of the corresponding video. Under the same method of generating temporal scores, the four video chunks of video II 420 each have a temporal score of 2; and the four video chunks of video III 430 each have a temporal score of 1.

The final scores of the video chunks are listed in the fourth column of table 440. In this embodiment, the final score for each video chunk equals the sum of the spatial score and temporal score of the video chunk. As discussed above, the final score may be generated based on a more complicated aggregation of spatial scores and temporal scores. A higher final score of a video chunk indicates that the video chunk is more likely to be accessed in a short period of time.

The video chunks are ranked based on their final scores. The rankings of the video chunks are listed in table 442. A higher final score of a video chunk corresponds to a higher ranking among the video chunks for caching. Based on the rankings, a selected number of video chunks are cached. In the embodiment of FIG. 4B, the streaming video cache 444 can store eight video chunks; and therefore, the eight highest ranked chunks are listed in 444.

Figure 4C:
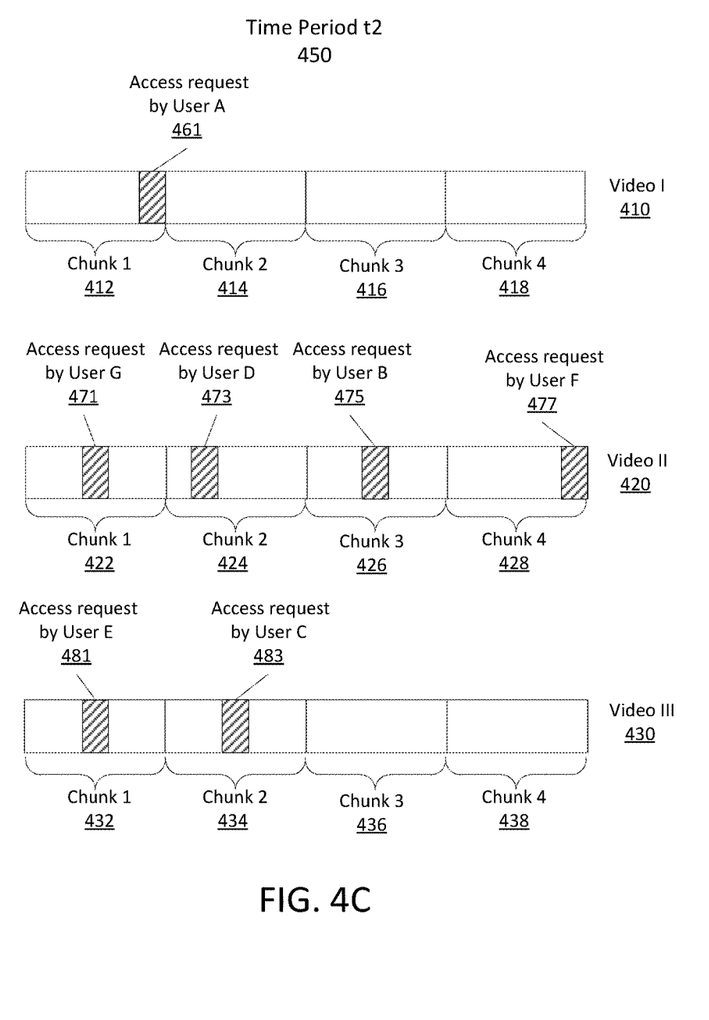
FIG. 4C is an example of access requests for the video chunks in FIG. 4A made by the users of FIG. 4A at a time period t2, a time period after t1, according to one embodiment.

FIG. 4C is an example of access requests for the video chunks in FIG. 4A made by the users of FIG. 4A at a time period t2, a time period after t1, according to one embodiment. At time period t2, User A still makes an access request for Chunk 1 412 of Video I 410 but the access request 461 reaches the end of Chunk 1 412. User B, who accessed Chunk 2 424 of Video II 420 at t1, now makes an access request 475 for Chunk 3 426 of Video II 420. User C still makes an access request for Chunk 2 434 of Video III 430 at t2 but the access request 483 does not reach the end of Chunk 2 434 anymore. User D, who accessed Chunk 2 414 of Video I 410 at t1, now makes an access request 473 for Chunk 2 424 of Video II 420. User E, who accessed Chunk 4 418 of Video I 410 at t1, now makes an access request 481 for Chunk 1 432 of video III 430 at a position not reaching the end of the video chunk. User F, who accessed Chunk 3 426 of Video II 420, now makes an access request 477 reaching the end of Chunk 4 428 of Video II 420. User G, who accessed Chunk 1 412 of Video I 410 at t1, now makes an access request 471 for Chunk 1 422 of Video II 420.

Figure 4D:
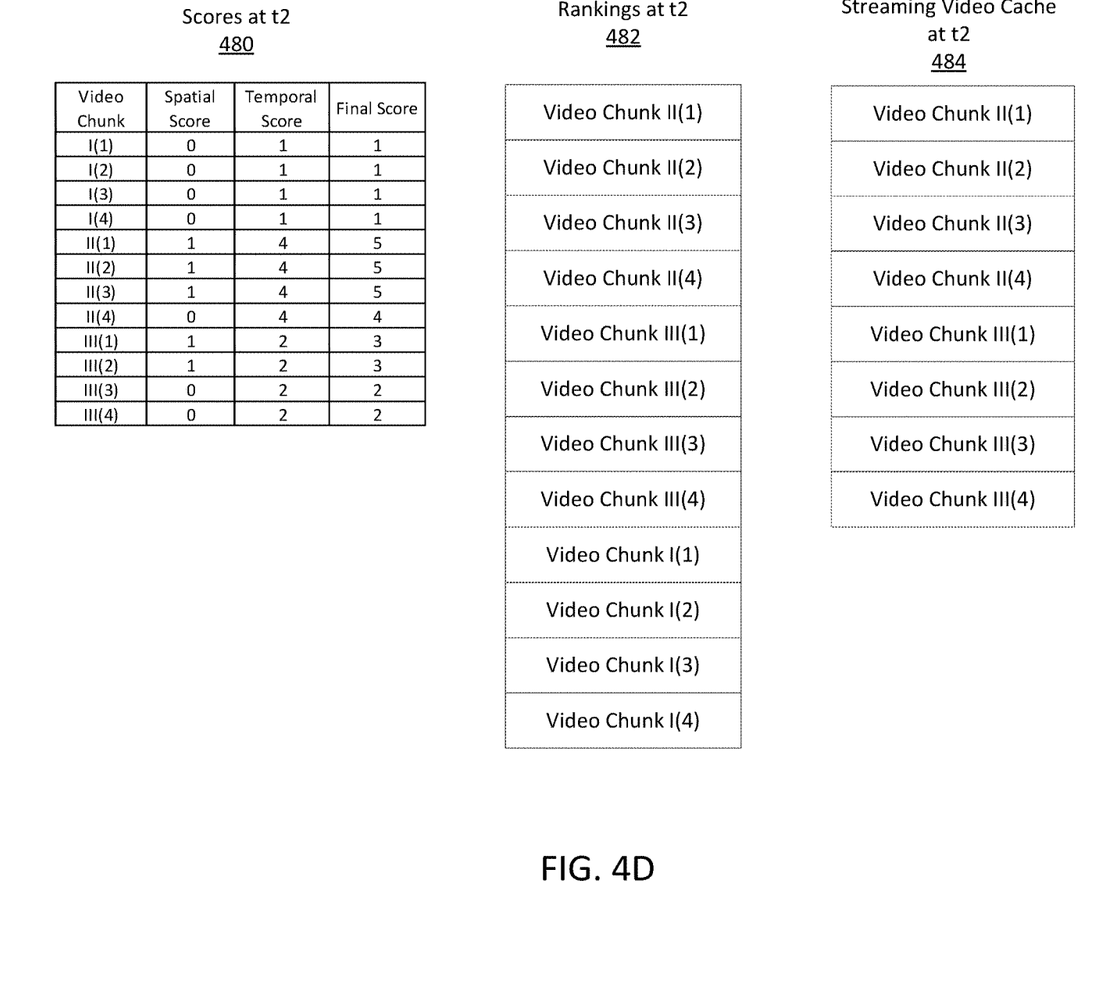
FIG. 4D is an example of the spatial scores, temporal scores, final scores and rankings of the video chunks in FIG. 4C and a streaming video cache at t2.

FIG. 4D is an example of the spatial scores, temporal scores, final scores and rankings of the video chunks in FIG. 4C and a streaming video cache at t2. The spatial scores, temporal scores and final scores of the video chunks at t2 are listed in table 480. The scores are generated by using the same method as in FIG. 4B. Because of the changes in access requests made by the users, the spatial scores and temporal scores of the video chunks are different at t2. At t2, the four video chunks of Video I 410 each has a spatial score of 0 and a temporal score of 1. Chunk 1 422, Chunk 2 424 and Chunk 3 426 of Video II 420 each has a spatial score of 1 and a temporal score of 4; while Chunk 4 428 of Video II 420 has a spatial score of 0 and a temporal score of 4. Chunk 1 432 and Chunk 2 434 of Video III 430 each has a spatial score of 1 and a temporal score of 2. Chunk 3 436 and Chunk 4 438 of Video III 430 each has a spatial score of 0 and a temporal score of 2.

The final scores of the video chunks at t2, as listed in the fourth column of table 480 are different from the finals scores of the video chunks at t1. Accordingly, the rankings of the video chunks at t2, as listed in table 482 are different from the rankings of the video chunks at t1. The streaming video cache 484 stores a different group of video chunks.

As described in FIG. 4A-D, video chunks in a streaming video cache can change upon a change in access requests made by users. However, sometimes, change in access requests for one or more video chunks does not necessarily result in change in spatial score or temporal sore of the video chunks or other video chunks. Even if there is change in spatial score or temporal score, the rankings of the video chunks may not be changed. In that case, the streaming video cache will not be updated.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

What is claimed is:

1. A computer-implemented method for caching streaming media, comprising:

receiving a plurality of requests from a plurality of user devices for a media chunk from a media stream that includes a plurality of media chunks;

generating, based on the plurality of requests, a spatial score for each media chunk, the spatial score representing a prediction of a likelihood of receiving one or more subsequent requests for the same media chunk over a period of time;

generating, based on the plurality of requests, a temporal score for each media chunk, the temporal score representing a prediction of a likelihood of receiving another request for the media chunk, wherein generating a temporal score for each media chunk of each media stream comprises analyzing temporal locality of the media chunk of the media stream, wherein analyzing the temporal locality of a media chunk comprises:

analyzing playback data of the media stream, wherein the playback data comprise information describing the media stream being recently accessed by one or more user devices and timestamp of each access of the media stream;

determining an augmented popularity of the media stream based on the analysis of the playback data of the media stream; and         computing the temporal score for the media chunk based on the augmented popularity of the media stream;

aggregating the spatial score and temporal score of each media chunk to obtain a final score of the media chunk;

ranking the media chunks based on corresponding final scores of the media chunks; and     caching a selected number of highest ranked media chunks in a computer cache.

2. The method of claim 1, wherein generating a spatial score for each media chunk comprises analyzing spatial locality of the media chunk of the media stream.

3. The method of claim 2, wherein analyzing the spatial locality of a media chunk comprises:
- analyzing playback data of the media chunk, wherein the playback data comprise information describing a sequential access pattern to the media chunk requested by a user device of the plurality of user devices;
- determining whether the access by the user device has reached the end of the playback of the media chunk; and
- updating the spatial score of the media chunk in response to the determination.

4. The method of claim 1, further comprising:
- generating the augmented popularity of the media stream using a time decay function.

5. The method of claim 4, wherein generating the augmented popularity of the media stream using a time decay function comprises:
- determining one or more popularity scores for access of the media stream by the one or more user devices, wherein the popularity score for a user device is inversely related to time elapsed since the access of the media stream by the user device; and
- computing the augmented popularity of the media stream based on the one or more popularity scores.

6. The method of claim 1, wherein the number of highest ranked media chunks selected for caching depends on at least one of the size of the media chunks and storage space of a streaming video cache.

7. The method of claim 1, further comprising:
- subsequent to caching the selected number of highest ranked media chunks in the computer cache and in response to receiving a subsequent plurality of requests from the plurality of user devices for media chunks including the selected number of highest ranked media chunks in the computer cache, providing at least some of the selected number of highest ranked media chunks in the computer cache to at least some of the plurality of user devices from the computer cache.

8. A non-transitory computer readable storage medium storing executable computer program instructions for caching streaming media, the computer program instructions comprising instructions that when executed cause a computer processor to:
- receive a plurality of requests from a plurality of user devices for a media chunk from a media stream that includes a plurality of media chunks;
- generate, based on the plurality of requests, a spatial score for each media chunk, the spatial score representing a prediction of a likelihood of receiving one or more subsequent requests for the same media chunk over a predetermined period of time;
- generate, based on the plurality of requests, a temporal score for each media chunk, the temporal score representing a prediction of a likelihood of receiving another request for the media chunk, by analyzing temporal locality of the respective media chunks of the media stream, wherein analyzing the temporal locality of a media chunk comprises:
  - analyzing playback data of the media stream, wherein the playback data comprise information describing the media stream being recently accessed by one or more user devices and timestamp of each access of the media stream;
  - determining an augmented popularity of the media stream based on the analysis of the playback data of the media stream; and
  - computing the temporal score for the media chunk based on the augmented popularity of the media stream;
- aggregate the spatial score and temporal score of each media chunk to obtain a final score of the media chunk;
- rank the media chunks based on corresponding final scores of the media chunks; and
- cache a selected number of highest ranked media chunks in a computer cache.

9. The computer readable medium of claim 8, wherein the computer program instructions for generating a spatial score for each media chunk of each media comprise instructions that when executed cause the computer processor to analyze spatial locality of the media chunk of the media stream.

10. The computer readable medium of claim 9, wherein the computer program instructions for analyzing the spatial locality of a media chunk comprise instructions that when executed cause the computer processor to:
- analyze playback data of the media chunk, wherein the playback data comprise information describing a sequential access pattern to the media chunk requested by a user device of the plurality of user devices;
- determine whether the access by the user device has reached the end of the playback of the media chunk; and
- update the spatial score of the media chunk in response to the determination.

11. The computer readable medium of claim 8, wherein the computer program instructions for analyzing the temporal locality of a media chunk further comprise instructions that when executed cause the computer processor to:
- generate the augmented popularity of the media stream using a time decay function.

12. The computer readable medium of claim 11, wherein the computer program instructions for generating the augmented popularity of the media stream using a time decay function comprise instructions that when executed cause the computer processor to:
- determine one or more popularity scores for access of the media stream by the one or more user devices, wherein the popularity score for a user device is inversely related to time elapsed since the access of the media stream by the user device; and
- compute the augmented popularity of the media stream based on the one or more popularity scores.

13. A computer system for caching streaming media, the system comprising:
- a non-transitory computer-readable storage medium storing executable computer program instructions, the computer program instructions comprising instructions that when executed cause a computer processor to perform steps, comprising:
  - receiving a plurality of requests from a plurality of user devices for a media chunk from a media stream that includes a plurality of media chunks;
  - generating, based on the plurality of requests, a spatial score for each media chunk, the spatial score representing a prediction of a likelihood of receiving one or more subsequent requests for the same media chunk over a period of time;
  - generating, based on the plurality of requests, a temporal score for each media chunk, the temporal score representing a prediction of a likelihood of receiving another request for the media chunk, wherein generating a temporal score for each media chunk of each media stream comprises analyzing temporal locality of the media chunk of the media stream, wherein analyzing the temporal locality of a media chunk comprises:
   analyzing playback data of the media stream, wherein the playback data comprise information describing the media stream being recently accessed by one or more user devices and timestamp of each access of the media stream;
   determining an augmented popularity of the media stream based on the analysis of the playback data of the media stream; and
   computing the temporal score for the media chunk based on the augmented popularity of the media stream;
aggregating the spatial score and temporal score of each media chunk to obtain a final score of the media chunk;
ranking the media chunks based on corresponding final scores of the media chunks; and
caching a selected number of highest ranked media chunks in a computer cache.

14. The system of claim 13, wherein generating a spatial score for each media chunk of each media comprises analyzing spatial locality of the media chunk of the media stream.

15. The system of claim 14, wherein analyzing the spatial locality of a media chunk comprises:
   analyzing playback data of the media chunk, wherein the playback data comprise information describing a sequential access pattern to the media chunk requested by a user device of the plurality of user devices;
   determining whether the access by the user device has reached the end of the playback of the media chunk; and
   updating the spatial score of the media chunk in response to the determination.

16. The system of claim 13, wherein the steps performed by the computer processor further comprise:
   generating the augmented popularity of the media stream using a time decay function.

17. The system of claim 16, wherein generating the augmented popularity of the media stream using a time decay function comprises:
   determining one or more popularity scores for access of the media stream by the one or more user devices, wherein the popularity score for a user device is inversely related to time elapsed since the access of the media stream by the user device; and
   computing the augmented popularity of the media stream based on the one or more popularity scores.

* * * * *